US006221949B1

(12) United States Patent
Gross et al.

(10) Patent No.: US 6,221,949 B1
(45) Date of Patent: Apr. 24, 2001

(54) COATING FORMULATION FOR USE IN AQUEOUS MULTICOAT PAINT SYSTEMS

(75) Inventors: Lutz-Werner Gross, Haltern; Ralf Stein; Egon Wegner, both of Münster; Gudrun Wiemann, Telgte, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 08/848,684

(22) PCT Filed: Oct. 25, 1995

(86) PCT No.: PCT/EP99/04188

§ 371 Date: Jun. 20, 1997

§ 102(e) Date: Jun. 20, 1997

(87) PCT Pub. No.: WO96/13537

PCT Pub. Date: May 9, 1996

(30) Foreign Application Priority Data

Oct. 28, 1994 (DE) ................................. 44 38 504

(51) Int. Cl.$^7$ .................................. C08G 18/65
(52) U.S. Cl. .................. 524/451; 528/71; 524/591; 525/457; 427/532; 427/541; 427/385.5; 427/388.4; 427/407.1; 427/409; 427/419.5; 427/419.3
(58) Field of Search ............... 528/71; 524/451, 524/591; 427/532, 541, 385.5, 388.4, 407.1, 409, 409.5, 419.3; 525/457

(56) References Cited

U.S. PATENT DOCUMENTS

| 4,450,200 | * | 5/1984 | Iwato ..................................... 428/323 |
| 4,558,090 | | 12/1985 | Drexler et al. .......................... 524/591 |
| 4,615,940 | | 10/1986 | Panush et al. . |
| 4,914,148 | * | 4/1990 | Hille et al. ............................ 524/507 |
| 4,968,536 | | 11/1990 | Goldner et al. . |
| 5,047,294 | | 9/1991 | Schwab et al. . |
| 5,120,415 | | 6/1992 | Yuan . |
| 5,147,927 | | 9/1992 | Baghdachi et al. . |
| 5,241,001 | | 8/1993 | Kania et al. . |
| 5,288,520 | | 2/1994 | Toyaoshima et al. . |
| 5,326,596 | * | 7/1994 | Kasari et al. ......................... 427/379 |
| 5,468,518 | | 11/1995 | Lein et al. . |
| 5,548,016 | * | 8/1996 | Provenzola et al. .................. 524/507 |
| 5,589,228 | | 12/1996 | Wegner et al. . |
| 5,612,095 | | 3/1997 | Brock et al. . |
| 5,633,037 | | 5/1997 | Mayer . |
| 5,700,522 | | 12/1997 | Nonweiler et al. . |
| 5,709,909 | | 1/1998 | Leibfarth et al. . |

FOREIGN PATENT DOCUMENTS

| 23 31 792 | 1/1975 | (DE) . |
| 43 28 287 A1 | 3/1994 | (DE) . |
| 0 228 003 A1 | 7/1987 | (EP) . |
| 0 255 078 A2 | 3/1988 | (EP) . |
| 0 311 209 | 4/1989 | (EP) . |
| 0 438 090 A1 | 7/1991 | (EP) . |
| 0 614 951 A2 | 9/1994 | (EP) . |

* cited by examiner

Primary Examiner—Rachel Gorr

(57) ABSTRACT

The present invention relates to a coating formulation for use in multicoat paint systems, which a) comprises as binder a water-dilutable polyurethane resin which has an acid number of from 10 to 60 and a number-average molecular weight of from 4000 to 25,000 and can be prepared by reacting with one another aa) a polyester—and/or polyether-polyol having a number-average molecular weight of from 400 to 5000 or a mixture of such polyester—and/or polyether-polyols, bb) a polyisocyanate or mixture of polyisocyanates, cc) a compound which has in the molecule at least one group which in reactive toward isocyanate groups and at least one group which is capable of forming anions, or a mixture of such compounds, and optionally dd) a hydroxyl—and/or amino-containing organic compound having a molecular weight of from 40 to 400, or a mixture of such compounds and at least partially neutralizing the resulting reaction product, and b) comprises pigments and/or fillers, the ratio of binder to pigment being between 0.5:1 and 1.5:1.

21 Claims, No Drawings

COATING FORMULATION FOR USE IN AQUEOUS MULTICOAT PAINT SYSTEMS

The present invention relates to a novel coating formulation for use in aqueous multicoat paint systems and which can be employed in particular for stone-chip protection coats.

The prior art discloses processes for the coating of motor-vehicle bodies, especially auto bodies, in which an electrodeposition coating material is applied and baked, an intermediate stone-chip primer is optionally applied, and the coats are baked separately or together with the filler coat to be applied, a filler is applied and baked, and a single—or multicoat topcoat system is applied and baked.

The third coat has the function in particular of filling out and covering instances of unevenness in order to level the substrate for the subsequent topcoat. The better this filling-out and covering of instances of unevenness in the substrate, the better the optical quality of the overall paint system. Not only the optical quality but also important mechano-technological properties of the overall paint system, such as protection from corrosion and, in particular, resistance to stone chipping and other mechanical attacks depend critically on the quality of the filler coat and—if present—of the intermediate stone-chip primer coat.

A corresponding process for the coating of motor-vehicle bodies in particular is known, for example, from EP-A-238 037.

Formerly, stoving enamels based on organic solvents were employed predominantly in the paint industry in order to produce the filler coats and intermediate stone-chip primer coats. For economic and ecological reasons, the paint industry has been attempting for some years to replace paint inorganic solvents by aqueous coating materials.

The preparation of such aqueous coating materials is known, inter alia, from DE-A-40 05 961. The coating materials described therein are suitable for the initially described process for producing filler coats and/or intermediate stone-chip primer coats. The DE-A document relates essentially to a coating material which comprises as binder a combination of water-dilutable polyurethane resins, water-dilutable polyester resins and amino resins.

However, these coating materials are not suitable for use in so-called wet-on-wet processes. Apart from this, the coating thicknesses obtained are still not satisfactory. This is because, for reasons of cost and the environment, the automobile industry has been attempting for some years to apply paint films which are as thin as possible without a loss in quality in comparison with the thicker coats which have been customary to date.

Hitherto, the coat applied in the abovementioned process step 3 was applied with a coat thickness of approximately 35 $\mu$m. In order to save on raw materials and energy in the production of multicoat paint systems, especially in the finishing of auto bodies, attempts have been made in particular to reduce the thickness of this coat. When using the aqueous coating systems known to date for these intended applications, however, such attempts were associated with a drastic deterioration in the properties of the overall paint system.

The object of the present invention is therefore to provide a coating formulation for use in aqueous paint systems, which formulation can be employed in step 3 of the process described initially and with which high-quality paint systems can be produced even when the coat thickness of the coat applied in step 3 is below 35 $\mu$m.

This object is achieved by the coating formulation comprising a) as binder a water-dilutable polyurethane resin which has an acid number of from 10 to 60 and a number-average molecular weight of from 4000 to 25,000, preferably from 8000 to 25,000, and can be prepared by reacting with one another aa) a polyester—and/or polyether-polyol having a number-molecular weight of from 400 to 5000, or a mixture of such polyester—and/or polyether-polyols, bb) a polyisocyanate or a mixture of polyisocyanates, cc) a compound which has in the molecule at least one group which is reactive toward isocyanate groups and at least one group which is capable of forming anions, or a mixture of such compounds, and optionally dd) a hydroxyl—and/or amino-containing organic compound having a molecular weight of from 40 to 400, or a mixture of such compounds, and at least partially neutralizing the resulting reaction product, and which b) comprises pigments and/or fillers, the ratio of binder to pigment being 0.5:1 and 1.5:1.

It is essential to the invention that, in contrast to the prior art, a coating formulation based on a physically drying polyurethane dispersion can be prepared without polyesters and amino resins. Surprisingly, the use of a coating material which comprises only polyurethane resins and pigments leads to a material which can be used particularly well as a filler coat and intermediate stone-chip primer coat, since it is unexpectedly stable to mechanical loads, especially stone chipping and impacts.

The component (a) can be prepared from aa), bb), cc) and optionally dd) by the methods of polyurethane chemistry which are well known to the person skilled in the art (cf. e.g. U.S. Pat. No. 4,719,132, DE-A 36 28 124, EP-A-89 497, EP-A-256 540 and WO 87/03829). As component (aa) it is possible to employ saturated and unsaturated polyester—and/or polyether-polyols, especially polyester—and/or polyether-diols having a number-average molecular weight of from 400 to 5000. Examples of suitable polyether-diols are polyether-diols of the general formula H($-$O$-$(CHR$^1$) $_n$-)$_m$OH, where R$^1$ is hydrogen or a substituted or unsubstituted lower alkyl radical, n is from 2 to 6, preferably from 3 to 4, and m is from 2 to 100, preferably from 5 to 50. Examples are linear or branched polyether-diols, such as poly(oxyethylene) glycols, poly(oxypropylene) glycols and poly(oxybutylene) glycols. The selected polyether-diols should not introduce excessive quantities of ether groups, since otherwise the polymers formed swell in water. The preferred polyether-diols are poly(oxypropylene) glycols in the molecular mass range M$_n$ from 400 to 3000.

Polyester-diols are prepared by esterifying organic dicarboxylic acids or their anhydrides with organic diols, or are derived from a hydroxycarboxylic acid or from a lactone. In order to prepare branched polyester-polyols, it is possible to employ a minor proportion of polyols or polycarboxylic acid with a higher functionality. The dicarboxylic acids and diols can be linear or branched aliphatic, cycloaliphatic or aromatic dicarboxylic acids or diols.

The diols used to prepare the polyesters consist, for example, of alkylene glycols such as ethylene glycol, propylene glycol, butylene glycol, 1,4-butanediol, 1,6-hexanediol, neopentylglycol and other diols, such as imethylolcyclohexane. It is also possible, however, to add small quantities of polyols, such as trimethylol-propane, glycerol and/or pentaerythritol. The acid components of the polyester consist primarily of low molecular weight dicarboxylic acids or their anhydrides having 2 to 30, preferably 4 to 18, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, where these exist. When forming polyester-polyols, it is also possible for relatively small quantities of carboxylic acids having 3 or more carboxyl groups to be present, for example trimellitic anhydride or the adduct of maleic anhydride with unsaturated fatty acids.

It is also possible to employ polyester-diols which are obtained by reacting a lactone with a diol. These polyester-diols are distinguished by the presence of terminal hydroxyl groups and repeating polyester components of the formula (—CO—(CHR$^2$)$_n$—CH$_2$—O). In this formula, n is preferably 4 to 6 and the substituent R$^2$ is hydrogen or an alkyl, cycloalkyl or alkoxy radical.

No substituent contains more than 12 carbon atoms. The total number of carbon atoms in the substituent does not exceed 12 per lactone ring. Examples hereof are hydroxycaproic acid, hydroxybutyric acid, hydroxydecanoic acid and/or hydroxystearic acid.

For preparing the polyester-diols, the unsubstituted ε-caprolactone, in which n has the value 4 and all R substituents are hydrogen, is preferred. The reaction with lactone is initiated by low molecular weight polyols such as ethyl glycol, 1,3-propanediol, 1,4-butanediol or dimethylolcyclohexane. However, it is also possible to react other reaction components with caprolactone, such as ethylenediamine, alkyldialkanolamines or urea.

Other suitable dials of relatively high molecular weight are polylactamdiols which are prepared by reacting, for example, ε-caprolactam with low molecular weight diols.

As component bb) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate.

Because of their good resistance to ultraviolet light, (cyclo)aliphatic polyisocyanates give rise to products having little tendency to yellow. Examples hereof are isophorone diisocyanate, cyclopentylene diisocyanate, and hydrogenation products of the aromatic diisocyanates, such as cyclohexylene diisocyanate, methylcyclohexylene diisocyanate and dicyclohexylmethane diisocyanate. Aliphatic diisocyanates are compounds of the formula OCN—(CR$^3$$_2$)$_r$—NCO, in which r is an integer from 2 to 20, in particular 6 to 8, and R$^3$, which can be identical or different, is hydrogen or a lower alkyl radical having 1 to 8 carbon atoms, preferably 1 to 2 carbon atoms. Examples hereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate and dicyclo-hexylmethane diisocyanate.

The component bb) must, with regard to the functionality of the polyisocyanates, have a composition such that no crosslinked polyurethane resin is obtained. The component bb) can comprise, in addition to diisocyanates, a proportion of polyisocyanates having functionalities of more than two, examples being triisocyanates. Products which have proven suitable triisocyanates are those compounds formed by trimerisation or oligomerisation of diisocyanates or by reaction of diisocyanates with polyfunctional OH—or NH—containing compounds. These include, for example, the biuret of hexamethylene diisocyanate and water, the isocyanurate of hexamethylene diisocyanate, or the adduct of isophorone diisocyanate with trimethylolpropane. The average functionality can be lowered if desired by adding monoisocyanates. Examples of such chain-terminating monoisocyanates are phenyl isocyanate, cyclohexyl isocyanate and stearyl isocyanate.

In order to ensure the dilutability in water of the polyurethane resins employed, groups capable of forming anions must be incorporated into the polyurethane molecules. The groups capable of forming anions ensure, after their neutralization, that the polyurethane resin can be stably dispersed in water. The polyurethane resin a) should have an acid number of from 10 to 60, preferably from 20 to 35. From the acid number it is possible to calculate the quantity of groups capable of forming anions which is to be introduced into the polyurethane molecules.

The introduction of groups capable of forming anions into the polyurethane molecules is achieved via the incorporation into the polyurethane molecules of compounds cc) which comprise in the molecule at least one group which is reactive toward isocyanate groups and a group which is capable of forming anions.

As component cc), preference is given to employing compounds which comprise in the molecule two groups which are reactive toward isocyanate groups. Suitable groups which are reactive toward isocyanate groups are, in particular, hydroxyl groups and primary and/or secondary amino groups. Suitable groups capable of forming anions are carboxylic, sulfonic and/or phosphonic acid groups, in which context carboxyl groups are preferred. As component cc) it is possible to employ, for example, alkanoic acids having two substituents on a carbon atoms. The substituent can be a hydroxyl group, an alkyl group or, preferably, an alkylol group. These alkanoic acids have at least one, generally from 1 to 3, carboxyl groups in the molecule. They have from two to about 25, preferably from 3 to 10, carbon atoms. Examples of the component cc) are dihydroxypropionic acid, dihydroxysuccinic acid and dihydroxybenzoic acid. A particularly preferred group of alkanoic acids are the α,α-dimethylolalkanoic acids of the general formula R$^4$—C(CH$_2$OH)$_2$COOH, where R$^4$ is a hydrogen atom or an alkyl group having up to about 20 carbon atoms.

Examples of such compounds are 2,2-dimethylol acetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of amino-containing compounds are α,δ-diaminovaleric acid, 3,4-diaminobenzoic acid, 2,4-diaminotoluenesulfonic acid and 2,4-diamino-diphenyl ether sulfonic acid.

The polyurethane resins a) employed in accordance with the invention can if desired be prepared using hydroxyl—and/or amino-containing organic compounds having a molecular weight of from 40 to 400, or a mixture of such compounds (component dd)). The use of the component dd) leads to an increase in the molecular weight of polyurethane resins. As component dd) it is possible to employ, for example, polyols having up to 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A and mixtures thereof.

The polyols are employed in general in quantities of up to 30% by weight, preferably from 2 to 20% by weight, based on the quantity of component aa) and dd) employed. As component dd) it is also possible to employ di—and/or polyamines containing primary and/or secondary amino groups. Polyamines are essentially alkylene-polyamines having 1 to 40 carbon atoms, preferably about 2 to 15 carbon atoms. They can carry substituents which have no hydrogen atoms which react with isocyanate groups. Examples are polyamines of linear or branched aliphatic, cycloaliphatic or aromatic structure having at least two primary amino groups. Diamines which can be mentioned are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-dianinodicyclohexylmethane and aminoethylethanolic amine. Preferred diamines are hydrazine, alkyl- or cycloalkyldiamines, such as propylenediamine and 1-amino-3-aminomethyl-2,5,5-trimethylcyclohexane. It is also possible to employ as component dd) polyamines which contain more than two amino groups in the molecule. In such cases, however, it must be ensured, for example by using monoamines as well, that no crosslinked polyurethane resins are obtained. Such polyamines which can be used are diethylenetriamine, triethylenetetramine, dipropylenetriamine and dibutylenetriamine. An example of a monoamine is ethylhexylamine.

The preparation of component a) is part of the prior art and is described in detail, for example, in U.S. Pat. No. 4,719,132, DE-A 36 28 124, EP-A 89 497, EP-A-256 540 and WO 87/03829.

In order to neutralize the component a) it is possible to employ ammonia and/or amines (especially alkylamines). amino alcohols and cyclic amines, such as di- and triethylamine, dimethylaminoethanolamine, diisopropanolamine, morpholine, or an N-alkylmorpholine. Readily volatile amines are preferred for the neutralization.

It is particularly important to give thought to the ratio of binders to pigment and/or filler. In accordance with the present solution, this ratio lies between 0.5:1 and 1.5:1. The preferred range is between 0.6:1 and 1.2:1.

A proven pigment and/or filler is talc. Its proportion in the overall quantity of pigment and fillers is from 20 to 80% by weight. The preferred range is from 30 to 70% by weight.

It is possible if desired, in accordance with the invention, to add small quantities of amino resins. These should not make up more than 10% by weight, based on the overall quantity of the coating formulation according to the invention. It is better to remain below 5% by weight.

Such amino resins are well known to the person skilled in the art and are offered by many companies as commercial products. Amino resins are condensation products of aldehydes, and especially formaldehyde, with, for example, urea, melamine, guanamine and benzoguananine. The amino resins contain alcohol groups, preferably methylol groups, which in general are etherified partially or completely with alcohols, or imino groups. It is preferred to employ water-dilutable amino resins, especially water-dilutable melamine-formaldehyde resins.

Polyisocyanate crosslinking agents can likewise be present in the coating formulation. The proportions thereof are normally below 30% by weight, preferably below 10% by weight. The reactivity of the crosslinking agents generally lies below 130 degrees Celsius.

The material according to the invention which is described permits, surprisingly, considerably lower coat thicknesses than comparable materials in accordance with the prior art. These thicknesses are far below 35 $\mu$m, i.e. normally below 15 $\mu$m. Despite this low coating thickness, a resistance to stone chipping is achieved which corresponds to coat thicknesses of 35 $\mu$m and more.

After pre-drying at about 70 degrees Celsius, the material according to the invention can be coated over with basecoat or clearcoat and baked at 130 degrees Celsius. If the color of the coating formulation according to the invention is harmonized with that of the basecoat, it is even possible to reduce the coat thicknesses of the basecoat still further without suffering any loss in quality.

In addition to the substances mentioned above, the coating formulations according to the invention can comprise all of the auxiliaries and additives which are known per se in paint technology, such as organic acids, further pigments and fillers, leveling agents, etc. With the aid of the coating materials according to the invention, the person skilled in the art can without problems produce aqueous stoving enamels which can be employed as intermediate stone-chip primer and/or as fillers. It is also possible, however, to produce aqueous coating materials which are suitable for other intended applications.

The coating formulation according to the invention can be applied by methods which are known per se, for example by spraying, brushing, dipping, flow-coating, knife-coating or rolling to any desired substrates, for example metals, plastics, wood or glass. The substrates to be coated can be provided with appropriate primers.

The present invention also relates, accordingly, to a process for the production of multicoat paint systems, in which 1) the substrate is coated with an electrodeposition coating material, 2) the electrodeposition coat applied in step 1 is optionally predried and baked, 3) the baked electrodeposition coat is coated over with a first aqueous coating material, 4) the coat applied in step 3 is optionally predried and, without a baking step, coated over with a second aqueous coating material, 5) the coat applied in step 4 is optionally coated over with a transparent coating material, and 6) the overall paint system is baked.

In this process, the above-described coating formulation according to the invention is used. This leads to the surprising result that coat thicknesses of 15 $\mu$m and less can be applied without suffering any losses in quality.

The invention is illustrated in more detail in the examples which follow. All parts and percentages are by weight unless expressly stated otherwise.

Preparation of Water-Dilutable Polyurethane Resins
Polyurethane Resin I 480.3 g of a 73% strength solution of a polyester polyol (acid number: 3.5 to 4.0, prepared from 39.5 parts by weight of dimerized fatty acid (Pripol$^R$ 1013, manufacturer: Unichema), 21.7 parts by weight of 1,6-hexanediol and 11.7 parts by weight of isophthalic acid) in methyl ethyl ketone, 31.4 g of dimethylolpropionic acid, 169.1 g of dicyclohexylmethane diisocyanate (Desmodur$^R$ W, manufacturer: Bayer AG), 6.5 g of neopentylglycol and 56.2 g of methyl ethyl ketone are weighed under nitrogen into a dry reaction vessel fitted with thermometer and reflux condenser, and the mixture is heated to 85 degrees C. This temperature is maintained until an NCO content of 1.11% has been reached. After cooling to 78 degrees C., 17.8 g of trimethylolpropane and 91.3 g of methyl ethyl ketone are added. As soon as a sample of the reaction mixture diluted with N-methylpyrrolidone in a weight ratio of 1:1 has a viscosity of between 12 and 15 dPas, 57.6 g of butyldiglycol are added to the reaction mixture and the reaction mixture is held at 78 degrees C. for 1 hour. In order to convert the polyurethane resins thus prepared into a water-dilutable form, 11.7 g of dimethylethanol-amine and 1020 g of distilled water are added. The methyl ethyl ketone is then distilled off from the resulting aqueous dispersion under vacuum at from 50 to 60 degrees C. The pH of the dispersion is then adjusted to 7.2 with dimethylethanolamine and the solids content of the dispersion is adjusted to 36.7% by weight with distilled water.

Preparation of Aqueous Coating Materials According to the Invention a) Aqueous Paint I In accordance with the parts by weight indicated in Table 1, one of the above-described aqueous polyurethane dispersions is admixed with deionized 20 water, a commercial leveling agent based on a water-dilutable acrylic resin, a solution of a commercial antifoam agent based on an unsaturated branched diol, dissolved in butyldiglycol and N,N-dimethyl-ethanolamine, and the mixture is formed into a paste with aftertreated titanium dioxide of the rutile type and talc and with a commercial lamp black. This mixture is discharged into a batchwise laboratory sand mill and dispersed until a fineness of max. 10 μm in the Hegmann grindometer is reached.

The aqueous paint I is then prepared from the dispersion mixtures, with the addition of further polyurethane resin dispersion and butyldiglycol, and it is adjusted with N,N-dimethylethanolamine to a pH of from 7.2 to 7.5 and with deionized water to a spray viscosity of 33 seconds (DIN 4).

b) Aqueous paints II and III

Paints II and III are prepared as for paint I. The parts by weight are evident from the table.

Application of the Aqueous Paints According to the Invention and Testing the Paint Films Obtained The paints according to the invention are sprayed in one pass with a dry film thickness of 15 μm on to phosphatized steel panels coated with a commercial electrodeposition coating, using an electrostatic high-speed rotary unit (Behr Ecobell, 45,000 rpm, flow rate: 120 ml/min, voltage: 60 kV). The application was made at an air temperature of 23 degrees Celsius and a relative atmospheric humidity of 60%. The sprayed panels were left to dry at 23 degrees Celsius for 5 min. They were subsequently predried at 70 degrees Celsius for 5 min in a convection oven. To produce the coating formulation I and III, the coats are coated over electrostatically with a commercial, silver, aqueous metallic basecoat with a dry film thickness of 14 μm. The resulting basecoat, after an evaporation time of 5 min at 23 degrees Celsius and subsequent pre-drying at 70 degrees Celsius for 5 min in a convection drier, is coated over with a commercial two-component clearcoat in a dry film thickness of 35 to 40 mm. The overall coating system is then baked at 130 degrees Celsius for 30 min.

In order to produce the coating system with paint II, a color-compatible red aqueous basecoat is applied electrostatically with a dry film thickness of 16 mm. The procedure is otherwise as described.

The paint systems obtained showed very good leveling, covered over the structure of the electrodeposition coat very well and showed good intercoat adhesion to the electrodeposition primer.

The stone chip resistance of the paint systems produced in accordance with the invention, despite a reduced coat thickness, is at least as high as the stone chip resistance of paint systems produced in accordance with DE-A 40 05 961.

The results of the relevant comparative tests can be found in Table 2.

TABLE 1

|  | aqueous paint I | aqueous paint II | aqueous paint III |
|---|---|---|---|
| Polyurethane dispersion I | 30.00 | 30.00 | 30.00 |
| Leveling agent | 0.60 | 0.60 | 0.60 |
| Deionized water | 10.00 | 12,00 | 10.00 |
| Antifoam agent | 2.00 | 2,00 | 2,00 |
| N,N-dimethylethanolamine | 0.10 | 0.10 | 0.10 |
| Titanium dioxide | 5.00 | 1.00 | 5.00 |
| Talc | 10.00 | 10.00 | 10.00 |
| Blanc Fixe (Sachtleben) | 4.00 | 0.00 | 4.00 |
| Bayferrox 180 (Bayer) | 0.00 | 2.00 | 0.00 |
| Bayferrox 130 (Bayer) | 0.00 | 4.00 | 0.00 |
| Paliogenmarron L4020 (BASF) | 0.00 | 2.00 | 0.00 |
| Aerosil R972 (Degussa) | 0.20 | 0.20 | 0.20 |
| Lamp black | 0.50 | 0.20 | 0.50 |
| Dispersion mixture | 62.40 | 64.10 | 62.40 |
| Polyurethane resin dispersion I | 34.00 | 34.00 | 32.00 |
| Cymel 327 (Cyanamide) | 0.00 | 0.00 | 2.00 |
| Butyldiglycol | 2.00 | 1.90 | 2.00 |
| deionized water | 1.60 | 0.00 | 1.60 |

TABLE 2

| Paint | I | II | III | IV**) | V**) |
|---|---|---|---|---|---|
| Coat thickness of stone-chip protection coat | 15 | 15 | 15 | 35 | 15 |
| Single impact test*) | 4/0 | 6/0 | 5/0 | 6/5 | 5/5 |

*)The test consists in bombarding the painted panel at an angle of 90 degrees with a steel ball, at a speed of 250 km/h, with the test panel being cooled to −23 degrees C. The test is evaluated in $m^2$ of surface removed/degree of corrosion. Degree of corrosion from 0 very good (no penetrations to the substrate) to 5 (penetration to the substrate over entire area)
**)Topcoat structure corresponds to sample, paint 1 and 3.

What is claimed is:

1. A stone-chip resistant primer coating composition, comprising:
    (a) a binder comprising a water-dilutable polyurethane resin having an acid number of from about 10 to about 60 and a number average molecular weight of from about 4000 to about 25,000, wherein said polyurethane resin is at least partially neutralized, and further wherein said polyurethane resin is prepared from a reaction mixture comprising
       (i) at least one polyol having a number average molecular weight of from about 400 to about 5000 selected from the group consisting of polyester polyols, polyether polyols, and mixtures thereof;
       (ii) at least one polyisocyanate; and
       (iii) at least one compound that has at least one group that is reactive with an isocyanate functionality and at least one group capable of forming an anion upon neutralization; and
    (b) at least one material selected from the group consisting of pigments, filters, and mixtures thereof, with the proviso that from about 20% to about 80% by weight of the material (b) consists of talc; wherein the ratio of binder (a) to the material (b) is from about 0.5:1 to about 1.5:1.

2. A coating composition according to claim 1, wherein the number average molecular weight of said polyurethane resin is from about 8000 to about 25,000.

3. A coating composition according to claim 1, wherein the reaction mixture further comprises at least one organic compound with a molecular weight of from about 40 to about 400 and having at least one group selected from hydroxyl functional groups, amine functional groups, and mixtures thereof.

4. A coating composition according to claim 1, wherein the ratio of the binder (a) to the material (b) is from about 0.6:1 to about 1.2:1.

5. A coating composition according to claim 1, wherein the talc is from about 30 to about 70% by weight of the total amount of the material (b).

6. A coating composition according to claim 1, further comprising a crosslinking agent.

7. A coating composition according to claim 6, wherein the crosslinking agent comprises at least one amino resin.

8. A coating composition according to claim 7, wherein the coating composition comprises up to about 10% by weight amino resin.

9. A coating composition according to claim 7, wherein the coating composition comprises up to about 5% by weight amino resin.

10. A coating composition according to claim 6, wherein the crosslinking agent comprises at least one polyisocyanate.

11. A coating composition according to claim 10, wherein the coating composition comprises up to about 30% by weight polyisocyanate.

12. A coating composition according to claim 10, wherein the coating composition comprises up to about 10% by weight polyisocyanate.

13. A process for improving stone chip resistance of a multilayer coating on a metal substrate, comprising the steps of:
   (a) applying to the substrate a layer of an electrodeposition coating material;
   (b) applying to the electrodeposition layer a layer of a first aqueous coating material, wherein said first aqueous coating material comprises
      (i) a binder comprising a water-dilutable polyurethane resin having an acid number of from about 10 to about 60 and a number average molecular weight of from about 4000 to about 25,000, wherein said polyurethane resin is at least partially neutralized, and further wherein said polyurethane resin is prepared from a reaction mixture comprising
         (A) at least one polyol having a number average molecular weight of from about 400 to about 5000 selected from the group consisting of polyester polyols, polyether polyols, and mixtures thereof;
         (B) at least one polyisocyanate; and
         (C) at least one compound that has at least one group that is reactive with an isocyanate functionality and at least one group capable of forming an anion upon neutralization; and
      (ii) at least one material selected from the group consisting of pigments, fillers, and mixtures thereof, with the proviso that from about 20% to about 80% by weight of the material (ii) consists of talc;
      wherein the ratio of the binder (i) to the material (ii) is from about 0.5:1 to about 1.5:1;
   (c) applying to the layer of the first aqueous coating material a layer of a second aqueous coating material;
   (d) baking the applied coating layers.

14. A process according to claim 13, comprising the further step of baking the electrodeposition layer before applying the first aqueous coating material.

15. A process according to claim 13, comprising the further step of drying the first aqueous coating material before applying the second aqueous coating material.

16. A process according to claim 13, comprising the further step of applying to the layer of the second aqueous coating material a layer of a transparent coating material.

17. A process according to claim 13, wherein the first aqueous coating material is applied in a layer up to about 35 μm thick.

18. A process according to claim 13, wherein the first aqueous coating material is applied in a layer up to about 15 μm thick.

19. A process according to claim 13, wherein from about 30% to about 70% by weight of the material (ii) consists of talc.

20. A stone-chip resistant primer coating composition according to claim 1, wherein said binder consists essentially of the water-dilutable polyurethane resin and, optionally, at least one member selected from the group consisting of:
   (a) up to about 10% by weight, based on the overall coating composition, of one or more amino resins and
   (b) up to about 30% by weight, based on the overall coating composition, of one or more polyisocyanate crosslinking agents.

21. A process for improving stone chip resistance of a multilayer coating on a metal substrate according to claim 13, wherein said binder consists essentially of the water-dilutable polyurethane resin and, optionally, at least one member selected from the group consisting of:
   (a) up to about 10% by weight, based on the overall coating composition, of one or more amino resins and
   (b) up to about 30% by weight, based on the overall coating composition, of one or more polyisocyanate crosslinking agents.

* * * * *

UNITED STATES PATENT AND TRADEMARK OFFICE
CERTIFICATE OF CORRECTION

PATENT NO. : 6,221,949 B1 Page 1 of 1
DATED : April 24, 2001
INVENTOR(S) : Gross et al.

It is certified that error appears in the above-identified patent and that said Letters Patent is hereby corrected as shown below:

<u>Title page,</u>
Item [86], please delete "PCT/EP/99/04188," and insert -- PCT/EP95/04188 --.

Signed and Sealed this

Twentieth Day of May, 2003

JAMES E. ROGAN
*Director of the United States Patent and Trademark Office*